Oct. 11, 1938.  E. G. WOLF  2,132,979
ROUGH ROUNDER
Filed July 16, 1937  2 Sheets-Sheet 1
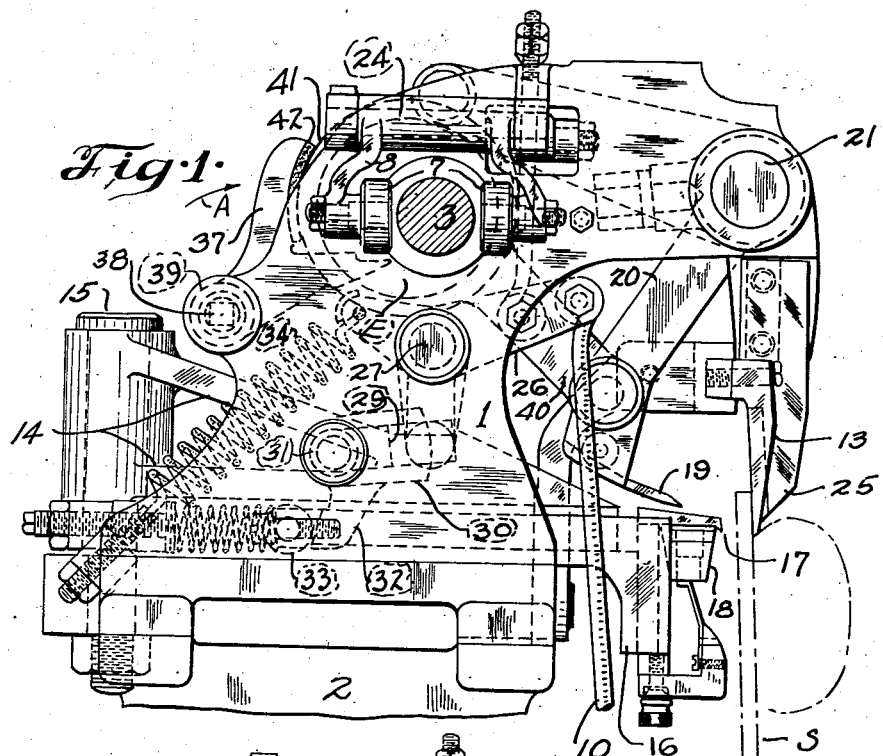
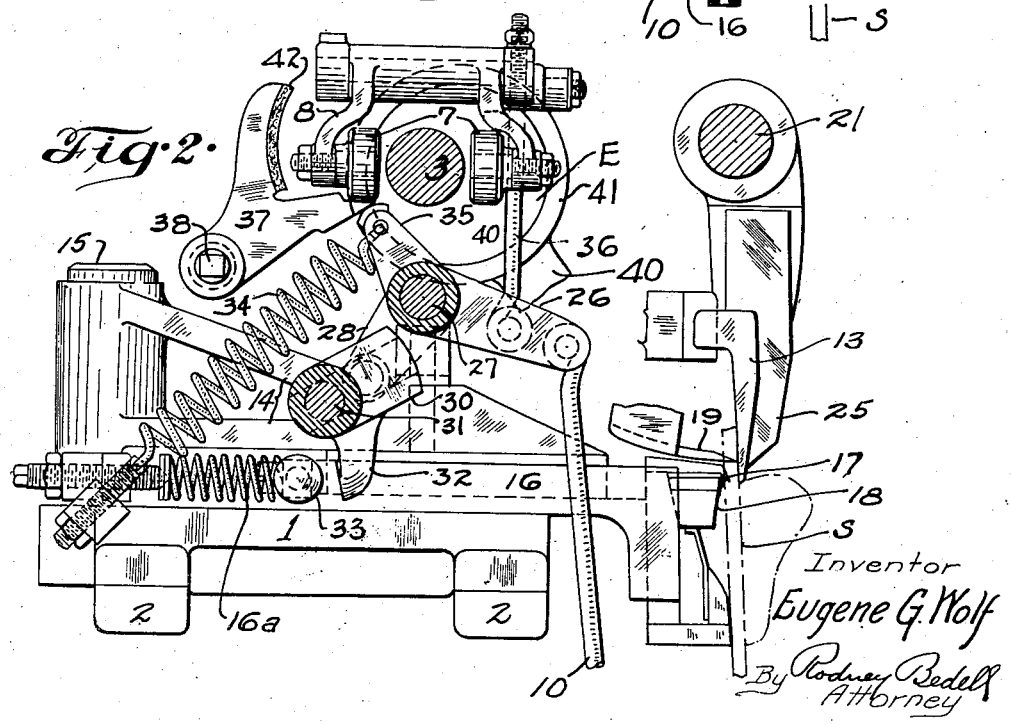
Inventor
Eugene G. Wolf
By Rodney Bedell
Attorney Oct. 11, 1938.  E. G. WOLF  2,132,979
ROUGH ROUNDER
Filed July 16, 1937  2 Sheets-Sheet 2
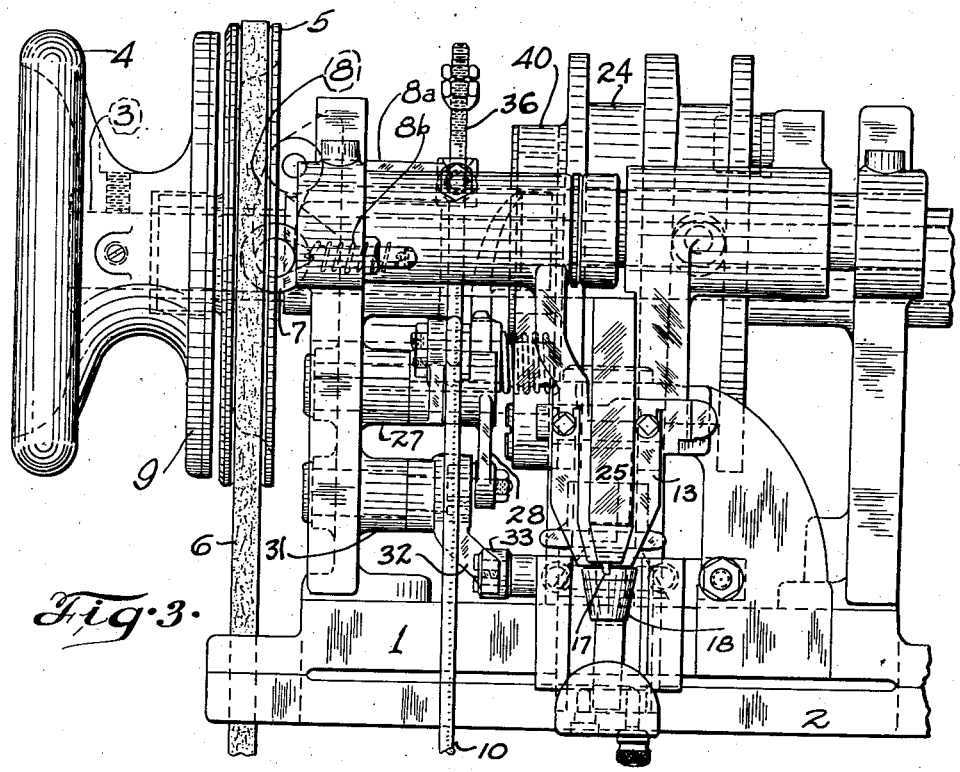
Fig. 3.
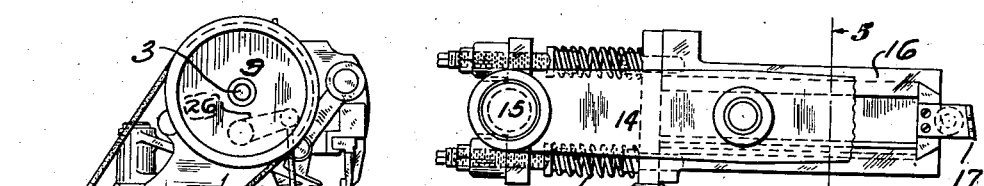
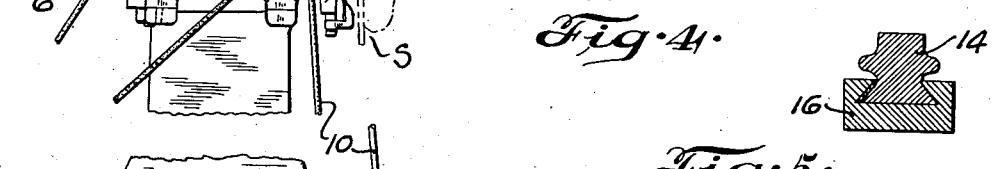
Fig. 4.  Fig. 5.
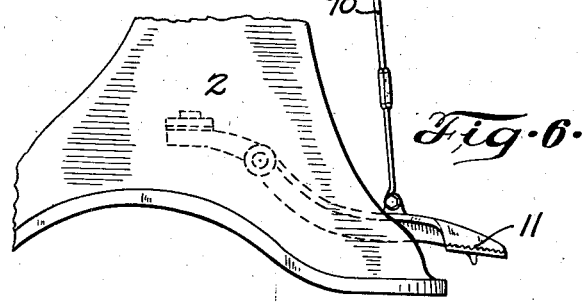
Fig. 6.
Inventor
Eugene G. Wolf
By Rodney Bedell
Attorney Patented Oct. 11, 1938

2,132,979

UNITED STATES PATENT OFFICE 2,132,979

ROUGH ROUNDER

Eugene G. Wolf, St. Louis, Mo., assignor to Landis Machine Company, St. Louis, Mo., a corporation of Missouri Application July 16, 1937, Serial No. 153,936

14 Claims. (Cl. 12—18)

The invention relates to shoe working machinery and more particularly to machines having a clutch connection between a driving member and a driven mechanism, which clutch connection is actuated by a treadle and which mechanism includes opposing elements forming a clamp for the work to hold it while it is being operated upon. One of the clamp elements may be provided with a lever or handle whereby the operator may open the clamp to facilitate insertion of the work into the machine or for removal of the work from the machine for inspection or after the operation is finished. This clamping element may mount a knife for cutting a stitch-receiving channel in the sole contemporaneously with the rough rounding of the sole edge.

An illustrative example of such machines is that used for rough rounding the shoe sole after the upper has been lasted thereto, the machine clamp being arranged to hold the work against the thrust of the cutting edge of the knife and to feed the work for successive knife operations. Such a rough rounding machine may also include a knife for cutting a stitch-receiving channel in the sole simultaneously with the rough rounding of the sole edge.

The present invention is applicable, but is not limited, to a rough rounding machine as described.

When operations are started, it is necessary to see that the movable clamping element, and the channeling knife thereon, if a channeling knife is present, is spaced from the other clamping element so that the shoe sole may be inserted in place. Then the clamp is closed and the operation begun. On the clutch type of machine, it is customary to provide a hand wheel on the driven shaft which may be rotated manually to move the rounding knife and clamp to position to permit the insertion of the sole. The movement of the clamp lever or of the hand wheel requires the use of one of the operator's hands and, to a certain extent, distracts his attention from the manipulation of the shoe.

The main object of the present invention is to leave both of the operator's hands free to manipulate the shoe and at the same time provide for manual control of the parts so that the sole may be inserted into the machine and removed therefrom without interference from the mechanisms which operate thereon.

This main object and other detailed objects as will be explained later are attained by the structure illustrated in the accompanying drawings, in which—

Figure 1 is a side elevation of a machine head embodying the invention and showing the parts in position to permit the insertion and removal of the shoe which is indicated in dot and dash lines.

Figure 2 is a corresponding elevation sectioned in part for better illustration of the mechanism and showing the parts with the knives in operating position.

Figure 3 is a front elevation of the machine head shown in Figures 1 and 2.

Figure 4 is a top view of a detail of the construction.

Figure 5 is a vertical transverse section taken on the line 5—5 of Figure 4.

Figure 6 is a view showing the machine head and its supporting frame with the foot treadle connection forming a part of the control device.

Machine head 1 is mounted upon an upright stand 2 and journals a mechanism shaft 3 carrying a hand wheel 4, fixed thereto, and a pulley 5 loose on the shaft and driven by belt 6 from a suitable drive shaft (not shown).

A familiar type of clutch is illustrated and includes rollers 7, mounted on clutch yoke 8, release spring 8b, and a horizontal arm 8a connected to a foot treadle 11 which, when depressed, thrusts the rollers against pulley 5 to move the same into engagement with disc 9, forming part of the hand wheel, to rotate the operating shaft. The machine head carries a stationary anvil 13 against which the shoe sole S may rest. An arm 14 is pivoted to the head at 15 and mounts a slide 16 provided with springs 16a which yieldingly thrust the slide to the right. The channeling knife 17 carried on the forward end of slide 16 is thrust into the shoe sole by springs 16a, the forward movement of the knife and slide being limited by contact of roller 18 with the face of the sole (Figure 2).

The rough rounding knife 19 is mounted on the lower end of a lever 20 pivoted to the head at 21. An eccentric E on shaft 3 oscillates lever 20 by means of a link 40 having a collar 41 surrounding eccentric E.

When the machine is operating, feed finger 25 starts at right (Figure 3), moves inwardly (Figure 2), and then to the left (Figure 3) to feed the work. Channeling knife 17 mounted on slide 16 moves to the left (Figure 3) in unison with feed finger 25. Feed finger 25 then backs away from the work (Figure 2) and returns one-half the distance to the right (Figure 3) to position itself for oncoming rounding knife 19. While rounding knife 19 is in the work, channeling knife 17 moves to the right to cut a stitch-receiving channel. Knife 19 then recedes from the work and feed finger 25 moves the balance of the distance to the right (Figure 3) to its original starting position.

All of the above described construction and operation corresponds to that shown in Meyer and French Patent 600,883 and is well known to those skilled in the art and in itself does not constitute the present invention.

*Channeling knife withdrawing mechanism.*—The upper end of rod 10 is connected to the outer end of arm 26 of a bell crank pivoted at 27 to the head and having a lower arm 28 pivotally mounting a block 29 slidably engaging the upper arm 30 of a bell crank pivoted at 31 to the head and having a lower arm 32 opposing a roller 33 mounted on a bearing projecting from the side of slide 16.

When treadle 11 is depressed to pull rod 10 downwardly (Figure 2), bell crank 26—28 is rotated in a clockwise direction and bell crank 30—32 is rotated in an anti-clockwise direction to free roller 33, leaving springs 16a free to thrust slide 16 forwardly, as shown in Figure 2. When pressure on treadle 11 is removed, coil spring 34, engaging tailpiece 35 on bell crank 26—28, moves the latter in an anti-clockwise direction and moves bell crank 30—32 in a clockwise direction to engage roller 33 and move slide 16 to the left, withdrawing knife 17 and roller 18 from the work (Figure 1), thus automatically freeing the work from the channeling knife whenever the treadle is released, the driving mechanism being de-clutched by the upward movement of bell crank arm 26 through connecting link 36 and its rotation of clutch arm 8a and the clutch yoke 8.

This position of the mechanism is assumed automatically, leaving both hands of the operator free to manipulate the work, including its removal from the machine and its replacement by another piece of work.

*Rounding knife positioning mechanism.*—When treadle 11 and rod 10 are depressed (Figure 2), tailpiece 35 engages and lifts a brake shoe 37, pivoted at 38 to head 1, and holds this brake shoe in the elevated position shown in Figure 2 so long as the machine is operating. A coiled spring 39, anchored to head 1 and brake shoe 37, tends to thrust the brake shoe in the direction of arrow A. Upon release of treadle 11 and rod 10, tailpiece 35 moves downwardly to the position shown in Figure 1, permitting brake shoe 37 to move in a clockwise direction from the position shown in Figure 2 to a position slightly more advanced than indicated in Figure 1. As the high point of eccentric E comes opposite to brake shoe 37, the collar 41 of link 40 will contact the friction lining 42 on brake shoe 37, which will bring the link, eccentric and shaft to rest in the position shown in Figure 1 with rough rounding knife 19 spaced from the work.

From the above description it will be seen that release of the treadle 11 results in the automatic de-clutching of the driving mechanism and in the movement of the channeling knife away from the work and the stopping of the machine with the rough rounding knife also spaced from the work, all without the operator manipulating the hand wheel 4 or being otherwise required to divert his hands or his attention from the work as has been necessary with previous machines of this type.

This desired result is effected without any substantial changes in the construction and normal functioning of the rough rounding and channeling structure.

Rough rounding machines of this type do not always include the channeling knife, and it will be understood that this element and the groove cutting function thereof may be omitted from the machine without eliminating the construction and function of the associated parts whereby the work is clamped in position to be held against the thrust and release of the rough rounding knife. Under these circumstances, when the operation is terminated and the pedal released, the clamp will be opened and the rounding knife held withdrawn from the work. The single manually operated device comprising treadle 11 and rod 10 utilizes the convenient foot control, but the same general effect would be readily obtained by use of a part designed to be engaged by the operator's knee, elbow, or even by one of the operator's hands.

These variations in general structure and other modifications in details of the machine may be made without departing from the spirit of the invention and exclusive use of such modifications as come within the scope of the claims is contemplated.

I claim:

1. In a machine for rough rounding shoe soles, a rounding knife, an anvil for supporting the shoe sole, a member opposing said anvil, a clamping spring for thrusting said member towards said anvil to clamp the sole between them, mechanism for reciprocating said knife to cut through the sole, a driver for said mechanism, a clutch for engaging said mechanism and said driver, a clutch spring for releasing said clutch, and a manually controlled device connected to said clutch and to said member, and operable when in one position to hold said clamping member away from said anvil against the action of said clamping spring and in another position to engage said clutch against the action of said clutch spring.

2. In a machine for rough rounding shoe soles, a rounding knife, a rotating shaft by which said knife is moved to and from the work to cut the same, an element mounted on said shaft eccentrically of its axis, a brake shoe opposing said element, a spring tending to thrust said shoe towards said element, a driving mechanism, a clutch between the same and said shaft, a spring tending to release said clutch, and a single manually controlled device for moving said brake shoe away from said element and for engaging said clutch.

3. In a machine for rough rounding shoe soles, a rounding knife, a rotating shaft by which said knife is moved to and from the work to cut the same, a driving pulley, a clutch between said shaft and said pulley, an element mounted on said shaft eccentrically of its axis, a brake shoe opposing said element, means thrusting said shoe towards said element, a member counteracting said means to hold said shoe out of engagement with said element when said clutch is functioning, and a single manually controlled device connected to said clutch and said member to free said shaft from said pulley and to permit said shoe to move into contact with said element, said element being engaged by said shoe when said rounding knife is withdrawn from the work.

4. In a machine for channeling shoe soles, a work supporting member, a channeling knife, a knife mounting structure slidable to and from said member and also movable alongside of said member for cutting a channel in a shoe sole resting thereon, means for thrusting said structure and knife towards said member, and a single manually controlled device for rendering said means ineffective and for withdrawing said structure and knife from said member.

5. In a machine for channeling shoe soles, a sole supporting member, a channeling knife and knife mounting structure slidable to and from said member, a spring thrusting said structure towards said member, a main shaft for moving said knife and structure along said member to cut a channel in a sole, a driver for said main shaft, means connecting said driver and main shaft, a device for holding said shaft and driver disconnected and for counteracting said structure spring, and a manually operable part for rendering said device ineffective.

6. In a machine for channeling shoe soles, a channeling knife, a spring for moving said knife into functioning position, a main shaft for operating said knife, a driving member, a driven member fixed on said shaft, and a clutch between said members, a spring for holding said clutch inoperative, a foot treadle and connecting rod for manipulating said clutch into functioning position when said treadle is depressed, and a device operable automatically when said treadle is released for moving said knife out of functioning position.

7. In a machine for channeling shoe soles, a support for the work, a channeling knife, spring structure for thrusting the same towards said support, means tending to move said knife away from said support against the thrust of said spring structure, and a foot treadle connected to said means and operating when depressed to render said means ineffective.

8. In a machine for operating on shoe soles, a work support, a spring actuated clamping member for holding the work against said support, a rough rounding knife, mechanism for moving said knife towards and from the work, a driver for said mechanism, a device for realeasing said mechanism from said driver and moving said clamping member away from said work support, a brake controlled by said device for stopping said mechanism with said knife withdrawn from the work, and a single manually operable structure for rendering said device ineffective and for engaging said mechanism and driver.

9. In a machine for operating on shoe soles, a channeling knife, a rough rounding knife, a shaft for operating said knives to cut the work, means for driving said shaft, a spring for withdrawing said channeling knife from the work, and a single manually controlled device for engaging said shaft and means and for counteracting the effect of said spring.

10. In a machine for operating on shoe soles, a channeling knife, a rough rounding knife, mechanism for moving said knives into positions to cut the work, means for driving said mechanism, and a single manually controlled device for releasing said mechanism from said means and for positioning said knives disengaged from said work.

11. In a machine for operating on shoe soles, a support for the sole, a channeling knife and a rough rounding knife, mechanism for moving said knives towards said support to cut the work, means for driving said mechanism, and a single manually controlled device for releasing said mechanism from said means and simultaneously engaging different portions of said mechanism to hold said knives in position disengaged from said work.

12. In a machine for operating on shoe soles, a driving pulley, a rough rounding knife, means for oscillating said knife to cut through the work, a channeling knife, a spring for thrusting said channeling knife into the work, a shaft for driving said means and mechanism reciprocating said channeling knife and the work to cut a channel in the latter, a driving pulley, a clutch between said pulley and shaft, a spring for disengaging said clutch and for withdrawing said channeling knife from the work, and a pedal controlled device connected to said spring for rendering said spring ineffective.

13. In a machine for operating on shoe soles, a work support, a slidable clamping member for holding the work against said support, a channeling knife mounted on said member, a spring for thrusting said member towards said support and thrusting said knife into the work resting thereon, a rounding knife, a shaft for mechanism operating said knives to cut the work, a driver for said shaft, a clutch for engaging said shaft and driver, there being a spring tending to move the clutch structure to disengaging position, a lever connected to said clutch and member and movable in one direction to render said latter mentioned spring ineffective whereby said clutch engages said shaft and driver and said clamping member and channeling knife move towards said support and the work thereon, and a foot treadle connected to said lever for moving it in said direction.

14. A structure as described in claim 13 which also includes means cooperating with said mechanism to stop the same, when the clutch is released, with the rounding knife withdrawn from the work.

EUGENE G. WOLF.